United States Patent Office 3,509,346
Patented Apr. 28, 1970

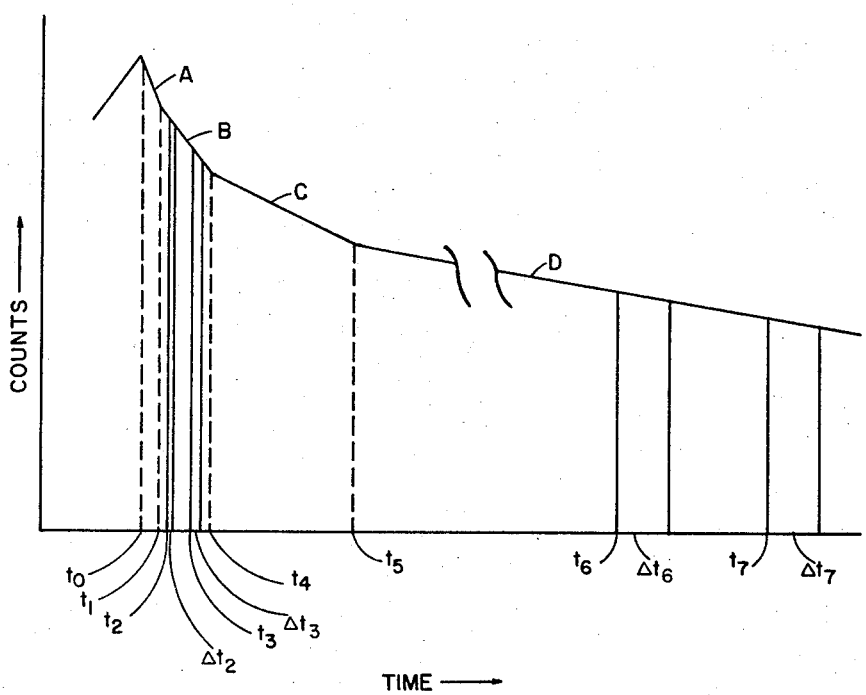
FIG III

3,509,346
IN PULSED NEUTRON OPERATIONS, USE OF SINGLE DETECTOR TO OBTAIN MEASUREMENTS OF POROSITY AND CHEMISTRY OF UNKNOWN SUBSTANCES
William R. Mills, Jr., and Linus S. Allen, Jr., Dallas, Tex., assignors to Mobil Oil Corporation, a corporation of New York
Filed June 18, 1965, Ser. No. 464,993
Int. Cl. G01t 1/18, 1/16; H01j 39/00
U.S. Cl. 250—83.6                    1 Claim

ABSTRACT OF THE DISCLOSURE

The specification discloses a pulsed neutron logging technique and system wherein a pulsed source is operated to produce bursts of fast neutrons and a single detector is employed to detect the resulting radiation between neutron bursts. The neutron burst time preferably is less than about twenty microseconds. The detector employed preferably is a thermal neutron detector having a relatively high efficiency for epithermal neutrons. Measurements are made of the neutrons detected within about fifty microseconds following each burst in order to obtain a measure of the epithermal neutrons detected and hence a measure of the porosity of the formations. At later time intervals, measurements are made of thermal neutrons detected in order to obtain a measure of the chemical nature of the formations.

---

This invention relates to the measurement of porosity by radiation analysis and more particularly to a pulsed neutron analyzing system for obtaining from a single detector a measure both of porosity and of the chemical nature of formations of interest.

In pulsed neutron well logging operations, a measure of the chemical nature of the formations traversed by a borehole is obtained by irradiating the formations with bursts of fast neutrons and detecting thermal neutrons or thermal neutron-capture gamma rays after each burst of fast neutrons. The rate of decay of the thermal neutrons or thermal neutron-capture gamma rays is measured and analyzed to distinguish between salt water- and oil-bearing formations in porous regions. A measure of the porosity of the formations also is essential for accurate analysis since the porosity influences the rate of decay of the radiation detected. From the standpoint of economics and accuracy, it is desirable to obtain porosity measurements with the same detector employed for obtaining a measure of the chemical nature of the formations.

In accordance with the present invention, there is provided a novel technique for obtaining a measure both of porosity and of the chemical nature of an unknown substance by employing a single detector. In the technique, the substance to be investigated is irradiated with bursts of fast neutrons spaced in time. The time of each burst is sufficient to allow fast neutrons to be slowed to the epithermal level in the substance and to reach a state of substantial saturation at the epithermal level but is substantially less than the time required for the fast neutrons to be slowed to the thermal level to a state of saturation. Within first and second time intervals between neutron bursts, there is detected radiation resulting from the irradiation of the substance with fast neutrons. The first time interval occurs within about fifty microseconds following termination of each neutron burst while the second time interval occurs at a time when epithermal neutrons have decayed substantially but while thermal neutrons are still present in the substance. The radiation detected has a first component whose density is dependent primarily upon the porosity of the substance and a second component whose density is dependent upon the chemical nature of the substance. From the radiation detected within the first time interval, there is produced a first function representative of the first component and distinguishable from the second component. In addition, there is produced a second function representative of the radiation detected within the second time interval.

In a more specific aspect, the time of each burst of fast neutrons is less than about twenty microseconds and preferably not greater than about five microseconds. During this short time interval, the epithermal neutrons reach a saturation level; however, the thermal neutron intensity is far below the saturation point. Thus, a maximum epithermal level is obtained relative to the thermal neutron level. Under these conditions and shortly after the neutron burst, we are able to observe a component of the decay curve which is due primarily to epithermal neutrons. This component may be measured to obtain an indication of porosity. At longer time intervals after the epithermal neutrons have decayed, a measure may be obtained of the thermal neutron intensity to obtain an indication of the chemical nature of the formations of interest.

In our operations, a measure both of porosity and of the chemical nature of the substance of interest has been obtained by the technique mentioned above by detecting thermal and epithermal neutrons with a thermal neutron detector having a relatively high efficiency for epithermal neutrons. The particular detector employed was of lithium iodide, substantially enriched in lithium-6.

It is to be understood that the same measurements are expected to be obtained by detecting epithermal neutron-capture gamma rays and thermal neutron-capture gamma rays since their rate of decay respectively corresponds with epithermal and thermal neutrons.

In a further embodiment, there is provided a radiation logging system for obtaining a measure of porosity and of the chemical nature of the formations traversed by a borehole. The system comprises a source for irradiating the formations with fast neutrons and means for controlling the source for the production of bursts of fast neutrons spaced in time. The time of each burst is sufficient to allow the fast neutrons to be slowed to the epithermal level in the formations and to reach a state of substantial saturation, but is substantially less than the time required for fast neutrons to be slowed to the thermal level to a state of saturation in the formations. A bare detector is provided for detecting radiation resulting from the irradiation of the formations with fast neutrons. The detector employed is sensitive to radiation having a first component whose density is dependent upon the porosity of the formations and a second component whose density is dependent upon the chemical nature of the formations. The response of the detector to the first component of radiation is relatively high. Measuring means coupled to the detector measures the intensity of radiation detected within first and second time intervals between neutron bursts, the first time interval being within about fifty microseconds following termination of the burst and the second time interval occurring when epithermal neutrons have decayed substantially but while thermal neutrons are present in the formations. In addition, means is provided for passing the detector and the source through the borehole for obtaining a measure of porosity and of the chemical nature of the formations traversed by the borehole.

As mentioned above, preferably, the first measuring time interval occurs within about fifty microseconds following termination of the neutron burst. For logging purposes, the second time interval occurs after about three hundred microseconds following termination of the neutron burst.

In one embodiment, the measuring means produces at least one continuous trace representative of radiation detected within the first time interval and at least one continuous trace representative of radiation detected within a second time interval. Measuring means may also be employed to produce a first measurement related to the mean life of radiation detected within the first time interval and a second measurement related to the mean life of radiation detected within the second time interval.

For further objects and advantages of the present invention and for a more complete understanding thereof, reference may now be had to the following detailed description taken in conjunction with the accompanying drawings, wherein:

FIGURE 3 represents a radiation time decay curve.

Figure 1:
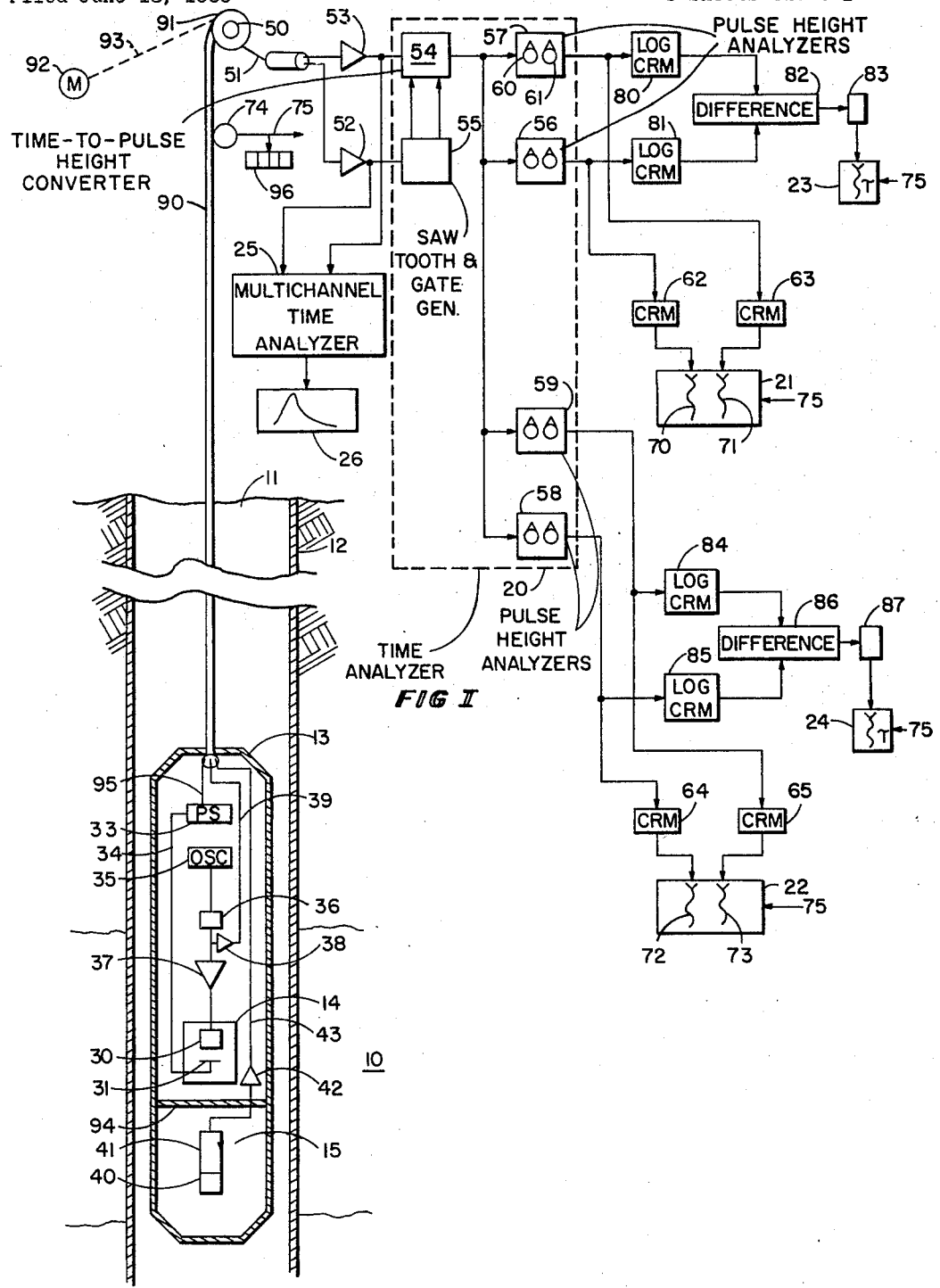
FIGURE 1 represents the system of the present invention for investigating formations traversed by a borehole.

Referring now to FIGURE 1 of the drawings, there will be described the method and system of the present invention for investigating unknown substances. In this illustration, the unknown substances of interest are those present in the formation fluid; for example, the fluids in formation 10 traversed by a borehole 11 lined with casing 12. In carrying out the method, a borehole tool 13 containing a pulsed neutron source 14 and a detector 15 is lowered into the borehole 11. The formations are irradiated with short bursts of fast neutrons spaced in time. The fast neutrons in turn are slowed to the epithermal level and then to the thermal level by the formations traversed by the borehole. At these energy levels, the neutrons are captured by the elements of the formations which in turn emit epithermal neutron-capture gamma rays and thermal neutron-capture gamma rays. The slowed neutrons or the capture gamma rays are detected by the detector 15 for the production of the desired measurements.

In obtaining the desired measurements, the output of the detector 15 is applied to the surface to a time analyzer system, illustrated by dotted line 20 and containing a plurality of separate time channels. Time analyzer system 20 is employed for obtaining a measure of the intensity of radiation detected within a first time interval occurring shortly after each burst of fast neutrons and at a later second time interval. The measurements within the first time interval are employed to obtain an indication of porosity while the measurements within the second time interval are employed to obtain an indication of the chemical nature of the formations.

More particularly, we have found that by irradiating a substance of interest with very short bursts of fast neutrons and obtaining measurements during the lifetime of epithermal neutrons after the fast neutron burst, epithermal neutrons may be distinguished from thermal neutrons even though detected by the same detector. With very short burst times, a maximum epithermal neutron density is obtained relative to the thermal neutron intensity. This is due to the much shorter slowing down time of epithermal neutrons. Moreover, by employing a thermal neutron detector having a relatively high efficiency for epithermal neutrons, the epithermal neutron density may be observed and distinguished from the thermal neutron density immediately after the end of the neutron burst. Measurements later in time, after the decay of epithermal neutrons, may be made to obtain a measure predominantly of thermal neutrons.

The foregoing phenomenon may be understood by reference to the curves of FIGURES 2A–2E. These curves were obtained with a bare lithium iodide detector, 96 percent enriched in lithium-6, and reflect the decay of epithermal and thermal neutrons in fresh water. The ordinate scale is logarithmic and the abscissa is linear. Since the detector was bare, detection was limited to neutrons from the water under investigation. In obtaining the curve of FIGURE 2A, a burst time of two microseconds was employed. Fast neutron burst times of 5, 10, 20, and 50 microseconds were employed for obtaining the curves, respectively, of 2B, 2C, 2D, and 2E. The end of the neutron burst is at time $a$. The time scale in FIGURE 2E has been reduced by a factor of two.

Figure 2:
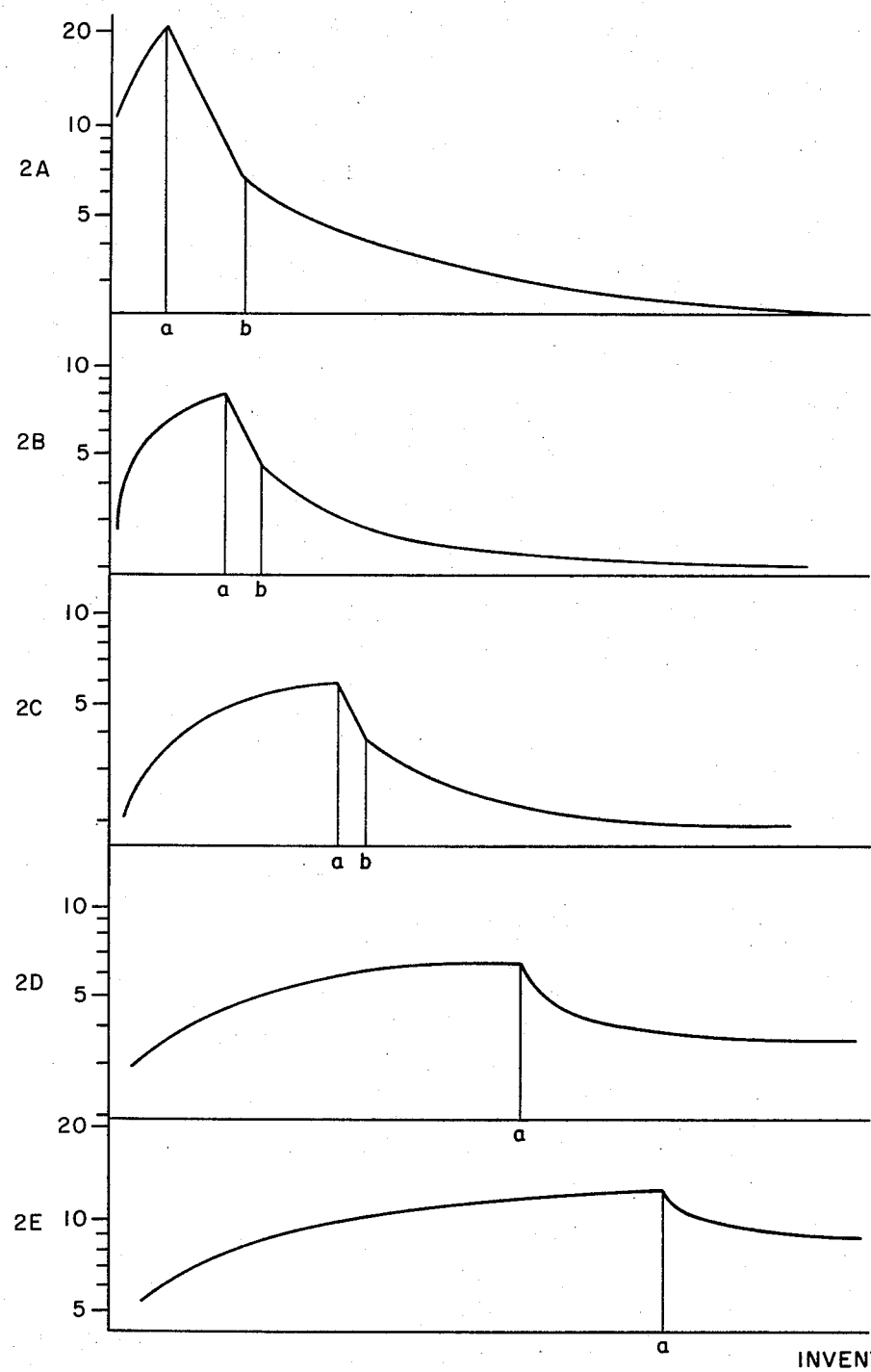
FIGURES 2A–2E represent curves useful in understanding the present invention.

Referring particularly to FIGURE 2A, the portion of the curve between $a$ and $b$ reflects a slope distinctive from that found beyond $b$. It has been found that the slope between $a$ and $b$ is due to a large extent to epithermal neutrons while the slope beyond $b$ is due predominantly to thermal neutrons. This is evident from the much faster rate of decay of the first portion of the curve compared with the second portion. Referring to FIGURES 2B–2E, it can be seen that the distinctive slope between $a$ and $b$ and reflecting the decay of epithermal neutrons is observable but the effect decreases in magnitude as the burst time increases. This is due to the fact that as the burst time increases, more thermal neutrons are formed until finally a state of saturation is reached. The increase in thermal neutron density is reflected by the increase in height of the thermal neutron component of the curve relative to the epithermal neutron component. At long burst times, the thermal neutron density becomes so great following the end of the burst that the epithermal neutrons are difficult to observe.

For best results in obtaining measurements of epithermal neutrons, the fast neutron burst times should be less than five microseconds and at the most should not extend beyond twenty microseconds. This becomes evident upon analysis of FIGURES 2A–2E.

In well logging operations, the above technique and system may be employed to obtain a measure both of porosity and of the chemical nature of the formations. In such operations, the first and second time measuring intervals are selected to reduce the effect of the borehole fluid.

FIGURE 3 illustrates an idealized decay curve but similar to one which may be obtained when logging the formations traversed by a borehole. In this figure, time $t_0$ represents the end of a neutron burst. The curve portion A between $t_0$ and $t_1$ reflects a strong component due to the epithermal neutrons from the borehole fluid. For our purposes, the curve portion B between $t_1$ and $t_4$ is the time interval of interest for measuring porosity. During this time, the epithermal neutrons from the borehole fluid have substantially died away leaving a strong component due to the epithermal neutrons from the formation. This time portion may occur within about 6–50 microseconds folowing termination of a neutron burst. The curve portion C between $t_4$ and $t_5$ reflects a strong component due to thermal neutrons from the borehole fluid. The curve portion D extending beyond $t_5$ is the second time interval of interest in our logging operations. During this time, the curve is made up predominantly of thermal neutrons from the formation and begins at about three hundred microseconds.

Referring again to FIGURE 1, the time analyzer 20 employed is adjusted to obtain measurements between $t_1$ and $t_4$ and beyond the time period $t_5$ to obtain the desired logs. The measurements obtained may be applied to continuous recorders 21 and 22 to obtain continuous traces representative of the intensity of radiation detected within these two time periods, or also may be applied to other instrumentation to obtain a log of the mean life of the radiation detected within the time period $t_1$ and $t_4$ and the time period beyond $t_5$. The mean life may be recorded on recorders 23 and 24.

In actual operations, continuous logs may be recorded by recorders 21–24 during a logging run. The logs obtained may be analyzed to locate formations of interest. After the formations of interest have been identified, a detailed study of these formations may be made by obtaining a time decay curve, as reflected by FIGURE 3, with instrumentation including a multichannel time analyzer 25 and a suitable readout 26 which may be an x–y plotter. An accurate determination of the mean life of the epithermal component of the curve between times $t_1$ and $t_4$ may be obtained by extrapolating the curve portions C and D of FIGURE 3 back toward the termination of the neutron burst and subtracting these portions by well-known subtraction techniques from the curve portion B. The result obtained is a corrected curve representative primarily of the epithermal neutrons from the formations and hence of porosity.

As mentioned above, the curves obtained in FIGURES 2A–2E were obtained with a lithium iodide detector substantially enriched in lithium-6, as indicated previously. When practicing the present invention by measuring slowed neutrons, this detector has proved effective since it has a relatively high efficiency for epithermal neutrons. Another suitable thermal neutron detector which has a relatively high efficiency for epithermal neutrons is a bare helium-3 detector at superatmospheric pressure. Such a detector is described in U.S. Patent No. 3,102,198.

In practicing the present invention, it is to be understood that gamma rays also may be detected and measured. Suitable gamma ray detectors are solid scintillation detectors, such as those made of sodium iodide. It is expected that bare detectors of this type will produce the same results as the lithium iodide detector since they will detect capture gamma rays whether produced upon the capture of epithermal neutrons or thermal neutrons.

A detailed description of the instrumentation employed to carry out the present invention now will be given. Referring to FIGURE 1, the neutron source 14 comprises an ion source 30 of deuterium and a target 31 of tritium. Trigger pulses of positive polarity periodically are applied to the deuterium ion source for ionizing the deuterium. The deuterium ions produced are accelerated to the target 31 by a high negative voltage applied thereto from power supply 33 and conductor 34. The reaction between the deuterium ions and tritium produces bursts of neutrons of energy of about 14.3 mev. which then irradiate the adjacent formations.

The pulses for ionizing the deuterium are obtained from an oscillator 35 and a pulse generator 36. More particularly, the oscillator produces sharp trigger pulses which are applied to trigger the pulse generator 36. The pulse generator, which may be a suitable phanastron, produces pulses of predetermined width which are applied by way of amplifier 37 to ion source 30. The frequency and width of the pulses applied to the ion source may be varied by suitable adjustment of oscillator 35 and pulse generator 36. In one embodiment, the period between pulses from oscillator 35 may be of the order of 2500 microseconds. The width of the pulses from pulse generator 36 is less than about twenty microseconds and preferably not greater than about five microseconds as is evident from the above description. The output of the oscillator 35 also is applied to the surface by way of amplifier 38 and conductor 39 to trigger the uphole instrumentation. The detector 15, in one embodiment, comprises a scintillation crystal 40 of lithium iodide coupled to a photomultiplier tube 41. The output of the photomultiplier tube 41 is applied to the surface by way of amplifier 42 and conductor 43.

At the surface, pulses are taken from conductors 39 and 43 by way of suitable slip rings and brushes, illustrated at 50 and 51, and applied to analyzer system 20 by way of amplifiers 52 and 53. In the embodiment shown, the trigger pulses are applied to amplifier 52 while the pulses from the detector are applied to amplifier 53. In the operation of the system, time analyzer 20 is adjusted to be responsive to radiation detected within four time windows $\Delta t_2$, $\Delta t_3$, $\Delta t_6$, and $\Delta t_7$, as illustrated in FIGURE 3. In one embodiment, time window $\Delta t_2$ may begin at about six microseconds following the end of each burst of neutrons, while time window $\Delta t_3$ may begin at about eleven microseconds following the end of each burst of fast neutrons. Time windows $\Delta t_2$ and $\Delta t_3$ may have a width of the order of two microseconds each. Time windows $\Delta t_6$ and $\Delta t_7$ may begin, respectively, at about 400 and 1000 microseconds following the end of each burst of neutrons. The width of time windows $\Delta t_6$ and $\Delta t_7$ may be of the order of 100 microseconds. The radiation detected within $\Delta t_2$ and $\Delta t_3$ may be recorded by recorder 21 or employed to obtain a continuous trace by recorder 23 of the mean life of the radiation detected within time period $t_1$–$t_4$. The radiation detected within $\Delta t_6$ and $\Delta t_7$ is applied to recorder 22 and is also employed to obtain a continuous trace of the mean life, by recorder 24, of the radiation detected beyond time $t_5$.

The time analyzer system 20 disclosed comprises a time-to-pulse height converter 54 of the type described, for example, in "Time-to-Pulse Height Converter of Wide Range" by Joachim Fischer and Arne Lundby, The Review Of Scientific Instruments, vol. 31, No. 1, January 1960; a saw-tooth and gate-pulse generator 55; and four pulse height analyzers 56–59. The time-to-pulse height converter 54 is coupled to amplifier 53 for receiving the detector pulses while the saw-tooth and gate-pulse generator 55 is triggered by trigger pulses from amplifier 52. As disclosed in the above-mentioned article, the time-to-pulse height converter 54 produces pulses having heights proportional to the time that radiation is detected following the start of each saw-tooth wave. These pulses are selected according to height by analyzers 56–59 to select radiation detected by detector 15, respectively, within $\Delta t_2$, $\Delta t_3$, $\Delta t_6$, and $\Delta t_7$. Appropriate selection is carried out by adjustment of threshold control 60 and window width control 61 of each analyzer. The outputs of the analyzers are applied to continuous recorders 21 and 22 by way of count rate meters 62 and 63 and count rate meters 64 and 65. These recorders thus record two traces 70 and 71 representative of the intensity of radiation detected within $\Delta t_2$ and $\Delta t_3$ and two traces 72 and 73 representative of the intensity of radiation detected within $\Delta t_6$ and $\Delta t_7$. The charts of recorders 21 and 22 are driven in correlation with depth by measuring reel 74 and connection illustrated by arrows at 75.

In obtaining a continuous trace (by recorder 23) representative of the mean life of radiation detected within time period $t_1$–$t_4$, the outputs of analyzers 56 and 57 are applied to logarithmic count rate meters 80 and 81 coupled to difference circuit 82 and to invert 83. These circuits evaluate the following expression:

$$\lambda = \frac{\ln\left(\frac{C_2}{C_3}\right)}{t_3 - t_2} = \frac{1}{\tau} \qquad (1)$$

wherein:

$\lambda$ is the decay constant;

$\tau$ is the mean life;

$C_2$ and $C_3$ are the cumulative counts observed, respectively, within equal time periods $\Delta t_2$ and $\Delta t_3$ within a plurality of cycles beginning, respectively, at $t_2$ and $t_3$ following a time zero, which may be the end of each burst of irradiation; and ln is the natural logarithm.

The output of difference circuit 82 is equal to $$\ln C_2 - \ln C_3, \text{ or } \ln\left(\frac{C_2}{C_3}\right)$$

and is representative of the decay constant since $t_3$ and $t_2$ are maintained constant. To obtain a measure of the mean life the decay constant is inverted at 83.

For further discussion of such a system for automatically measuring the mean life or decay constant, reference may be had to copending U.S. patent application Ser. No. 326,791, filed Nov. 29, 1963, now patent No. 3,143,473 entitled Radiation Measuring System and Method, and assigned to the same assignee as the present application.

A continuous trace recorded by recorder 24 and representative of the mean life of radiation detected beyond time $t_5$ is obtained by applying the outputs of analyzers 58 and 59 to logarithmic count rate meters 84 and 85 coupled to difference circuit 86 and inverter 87. In logging operations, the charts of recorders 23 and 24 are driven in correlation with depth by measuring reel 74 and connections illustrated at 75.

In the system shown in FIGURE 1, the borehole tool 13 is moved through the borehole by cable 90 wound and unwound upon a drum 91 driven by motor 92 and mechanical connection 93. A shield 94 is employed between the source and the detector in the borehole tool. Energizing current is applied to the power supply 33 in the borehole tool by way of conductors 95. Meter 96 coupled to connection 75 and measuring reel 74 is employed to obtain a measure of depth when employing analyzer 25 and readout 26.

In one embodiment, the neutron generator 14 may be of the type manufactured by N. V. Philips, Gloeilampenfabrieken, Eindhoven, Holland, Model No. 285, distributed in the U.S. by Norelco, 750 South Fulton Ave., Mount Vernon, N.Y. The difference circuits 82 and 86 may be of the type illustrated on page 248 of Electron Tube Circuits, Samuel Sealey, McGraw-Hill Book Company, 1958, Second Edition. The log count rate meters 80, 81, 84, and 85 may be of the type manufactured by Victoreen Instrument Company, Cleveland, Ohio, Model No. CRM-3C. The pulse height analyzers 56-59 may be of the type manufactured by Hamner Electronics Company, Inc., Princeton, N.J., Model No. N-603. The multichannel time analyzer 25 may be of the type manufactured by the Technical Measurement Corp., North Haven, Conn. Model CN-110 including a plug-in Model 211, Time-of-Flight Logic Circuit. The saw-tooth and gate-pulse generator 55 may be of a type 531 Textronix oscilloscope.

Now that the invention has been described, modifications will become apparent to those skilled in the art, and it is intended to cover such modifications as fall within the scope of the appended claims.

What is claimed is:
1. A method of obtaining measurements of porosity and of the chemical nature of the formations traversed by a borehole, comprising the steps of:
   irradiating said formations with bursts of fast neutrons spaced in time,
   the time of each burst being less than about twenty microseconds,
   the time between said neutron bursts being greater than four hundred microseconds,
   within first and second time intervals between neutron bursts, detecting, with a single detector, neutrons resulting from the irradiation of said formations with fast neutrons,
   said detector being a bare helium-3 proportional counter at superatmospheric pressure sensitive to thermal neutrons and having a relatively high efficiency for epithermal neutrons,
   said first time interval being within about fifty microseconds following the termination of each of said neutron bursts,
   said second time interval being at a time greater than about four hundred microseconds following the termination of each of said neutron bursts,
   said neutrons detected having an epithermal neutron component whose density is dependent upon the porosity of said formations, and a thermal neutron component whose density is dependent upon the chemical nature of said formations,
   said epithermal neutron component being detected primarily during said first time interval,
   from said neutrons detected within said first time interval, producing at least a first function representative of said epithermal neutron component and distinguishable from said thermal neutron component,
   from said neutrons detected within said second time interval, simultaneously producing at least a second function representative of said thermal neutron component, and
   simultaneously recording said first and second functions produced.

References Cited
UNITED STATES PATENTS 3,288,996  11/1966  Monaghan _____ 250—83.1 X ARCHIE R. BORCHELT, Primary Examiner S. ELBAUM, Assistant Examiner U.S. Cl. X.R.

250—83.3

PO-1050
(5/69)

UNITED STATES PATENT OFFICE
CERTIFICATE OF CORRECTION

Patent No. 3,509,346      Dated April 28, 1970

Inventor(s) William R. Mills, Jr., and Linus S. Allen, Jr.

It is certified that error appears in the above-identified patent and that said Letters Patent are hereby corrected as shown below:

Column 4, line 50, "folowing" should be --following--.
Column 6, line 46, "invert 83" should be --inverter 83--.
Column 8, under REFERENCES CITED, the following additional patents should be listed:

| | | | |
|---|---|---|---|
| 2,769,916 | 11/56 | Tittle | |
| 2,991,364 | 7/61 | Goodman | 250 - 83.3 |
| 3,102,956 | 9/63 | Armistead | 250 - 83.3 |
| 3,115,579 | 12/63 | Hall, Jr. | |
| 3,133,195 | 5/64 | Jones et al | 250 - 83.1 |
| 3,200,251 | 8/65 | Youmans | 250 - 83.1 |
| 3,256,438 | 6/66 | Armistead | 250 - 83.6(W) |
| Re. 25,689 | 11/64 | Pollock | |

SIGNED AND SEALED
AUG 25 1970

(SEAL)
Attest:

Edward M. Fletcher, Jr.
Attesting Officer

WILLIAM E. SCHUYLER, JR.
Commissioner of Patents